United States Patent
Zhang et al.

(10) Patent No.: US 11,190,108 B2
(45) Date of Patent: Nov. 30, 2021

(54) SWITCHING CIRCUIT, SYNCHRONOUS RECTIFICATION CONTROL CIRCUIT AND CONTROL METHOD THEREOF

(71) Applicant: Silergy Semiconductor Technology (Hangzhou) LTD, Hangzhou (CN)

(72) Inventors: Qiao Zhang, Hangzhou (CN); Xinlei Li, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 41 days.

(21) Appl. No.: 16/711,607

(22) Filed: Dec. 12, 2019

(65) Prior Publication Data

US 2020/0204080 A1 Jun. 25, 2020

(30) Foreign Application Priority Data

Dec. 21, 2018 (CN) .......................... 201811572812.8
Jan. 16, 2019 (CN) .......................... 201910040855.X

(51) Int. Cl.
*H02M 3/158* (2006.01)
*H02M 3/335* (2006.01)

(52) U.S. Cl.
CPC ..... *H02M 3/33592* (2013.01); *H02M 3/1588* (2013.01)

(58) Field of Classification Search
CPC .... H02M 3/156; H02M 3/158; H02M 3/1588; H02M 3/335; H02M 3/33569; H02M 3/33592
See application file for complete search history.

(56) References Cited

U.S. PATENT DOCUMENTS

| | | | |
|---|---|---|---|
| 6,075,716 A | 6/2000 | He et al. | |
| 6,385,057 B1 | 5/2002 | Barron | |
| 8,471,488 B1 | 6/2013 | Hopkins et al. | |
| 8,976,547 B2* | 3/2015 | Ren .......... | H02M 1/32 363/21.14 |
| 9,077,260 B2 | 7/2015 | Zhao et al. | |
| 9,124,169 B2 | 9/2015 | Garlow et al. | |
| 9,525,336 B2 | 12/2016 | Huang | |
| 2009/0243398 A1 | 10/2009 | Yohanan et al. | |
| 2014/0334205 A1* | 11/2014 | Zhang ................. | H02M 1/4258 363/89 |
| 2015/0207398 A1 | 7/2015 | Proca | |
| 2015/0216007 A1 | 7/2015 | Ferrara et al. | |
| 2018/0091040 A1* | 3/2018 | Wong ................ | H02M 3/33592 |
| 2018/0331615 A1* | 11/2018 | Yang ................ | H02M 3/33507 |
| 2020/0336071 A1* | 10/2020 | Iorio .................... | H02M 1/088 |

FOREIGN PATENT DOCUMENTS

CN  105119505 A  12/2015

* cited by examiner

*Primary Examiner* — Matthew V Nguyen

(57) ABSTRACT

A synchronous rectification control circuit for controlling a switching circuit comprising a synchronous rectifier switch, can include: a drive circuit configured to generate a drive signal to control switching states of the synchronous rectifier switch; and a voltage regulation circuit configured to control the drive circuit to adjust an amplitude of the drive signal to decrease to a preset threshold in an adjustment state when a drain-source voltage of the synchronous rectifier switch is greater than an adjustment threshold before the synchronous rectifier switch is turned off, where a time that the voltage regulation circuit is in the adjustment state is an adjustment time.

20 Claims, 8 Drawing Sheets

SWITCHING CIRCUIT, SYNCHRONOUS RECTIFICATION CONTROL CIRCUIT AND CONTROL METHOD THEREOF

RELATED APPLICATIONS

This application claims the benefit of Chinese Patent Application No. 201811572812.8, filed on Dec. 21, 2018, and claims the benefit of Chinese Patent Application No. 201910040855.X, filed on Jan. 16, 2019, both of which are incorporated herein by reference in their entirety.

FIELD OF THE INVENTION

The present invention generally relates to the field of power electronics, and more particularly to synchronous rectification control circuits, control methods, and switching circuits.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Synchronous rectification can reduce rectification loss by replacing a rectifier diode with a power metal-oxide-semiconductor field-effect transistor (MOSFET) having relatively low conduction resistance. A power MOSFET is a voltage-controlled device, and its voltage-current characteristic is linear when it is turned on. When a power MOSFET is used for rectification, a gate voltage must be synchronized with a phase of a rectified voltage in order to complete the rectification. Switching power supplies can typically operate in a discontinuous current mode (DCM) and a continuous current mode (CCM). Operation of synchronous rectification under different operation modes is also different.

Figure 1:
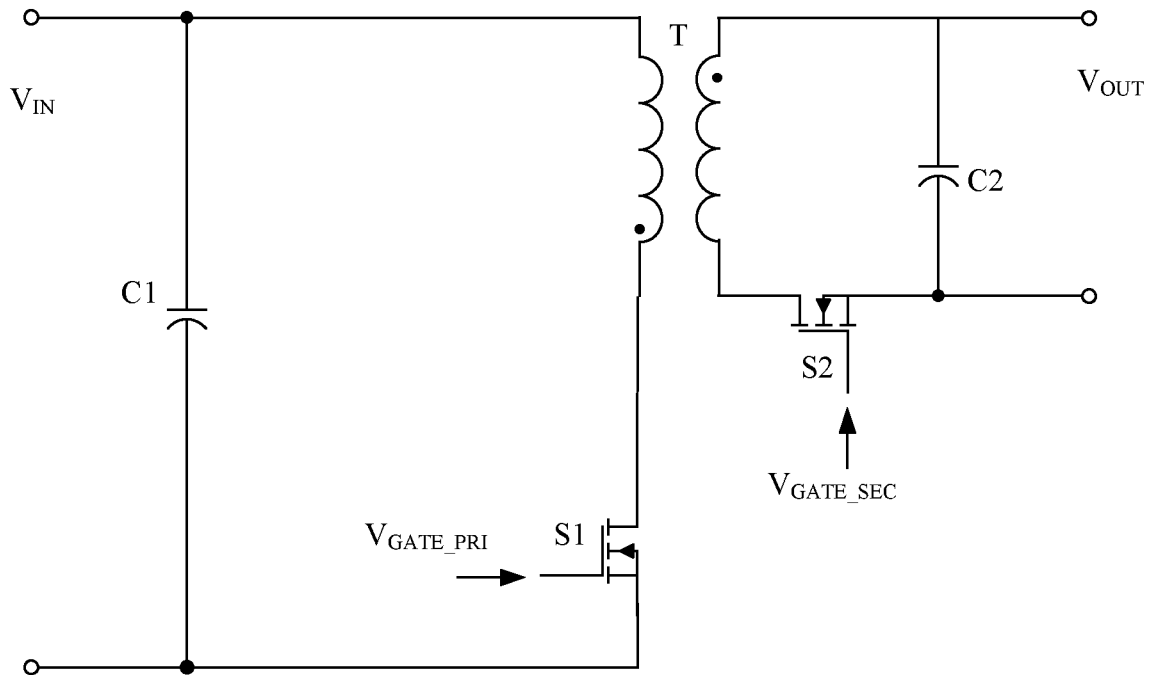
FIG. 1 is a schematic block diagram of an example flyback converter.

Referring now to FIG. 1, shown is a schematic block diagram of an example synchronous rectification flyback converter. This example flyback converter can include transformer T to realize isolation of a primary side and a secondary side, main power switch S1, synchronous rectifier switch S2, input capacitor C1, and output capacitor C2. When the flyback converter operates in the DCM mode, main power switch S1 may be controlled by drive signal $V_{GATE\_PRI}$ to be turned on only after a secondary synchronous rectification current reaches zero. At this time, synchronous rectifier switch S2 can be controlled by drive signal $V_{GATE\_SEC}$ to be turned off before or when the synchronous rectification current flowing through synchronous rectifier switch S2 decreases to zero, thereby avoiding the two switches being turned on at the same time. When the flyback converter operates in the CCM mode, main power switch S1 has a risk of conduction before the secondary synchronous rectification current reaches zero. In a switching power supply with a fixed frequency, the main power switch may be turned on at a fixed time. In a switching power supply with a variable frequency, the turn-on time of the main power switch can change greatly with changes of external conditions of the circuit (e.g., the change of input and output voltages, change of output power, etc.), which can be very difficult to predict.

Figure 2:
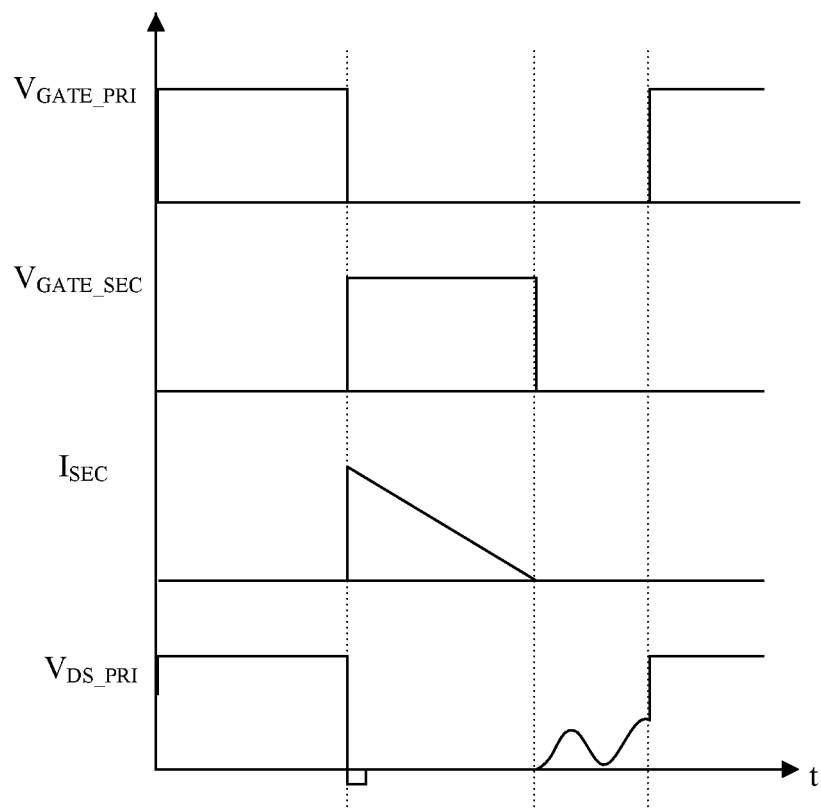
FIG. 2 is a waveform diagram of example relevant signals of the synchronous rectification flyback converter in the DCM mode.
Figure 3:
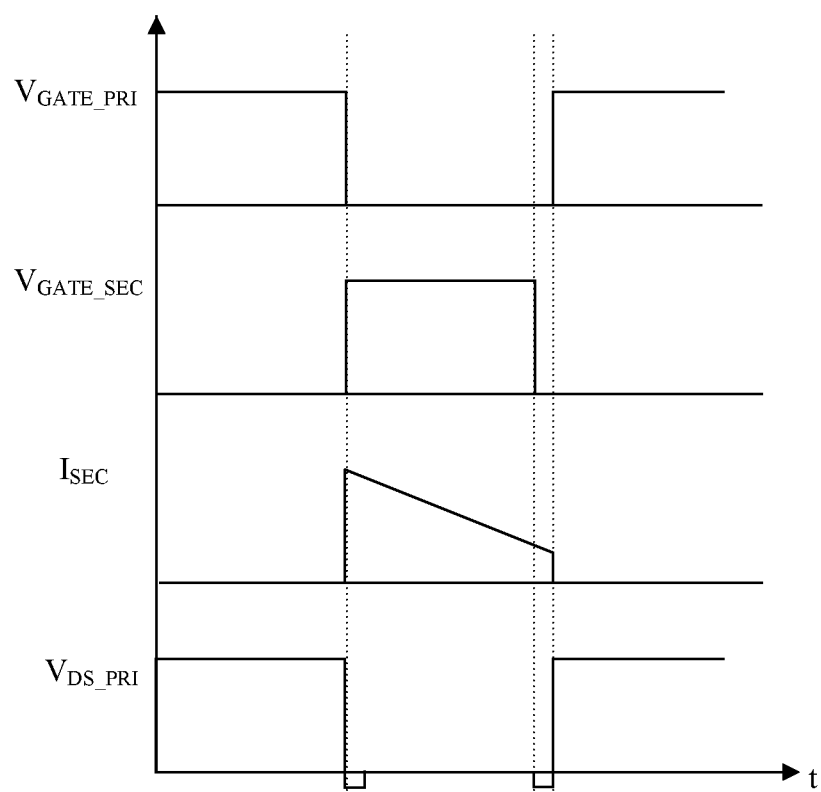
FIG. 3 is a waveform diagram of example relevant signals of the synchronous rectification flyback converter in the CCM mode.

Referring now to FIGS. 2 and 3, shown are waveform diagrams of example relevant signals of a synchronous rectification flyback converter in the DCM mode and in the CCM mode, respectively. Drive signal $V_{GATE\_PRI}$ of main power switch S1, drive signal $V_{GATE\_SEC}$ of synchronous rectifier switch S2, synchronous rectification current $I_{SEC}$, and drain-source voltage $V_{DS\_PRI}$ of main power switch S1, are respectively shown from top to bottom of the waveforms. When the switching power supply operates at a fixed frequency, main power switch S1 can be turned on at a fixed time, so synchronous rectifier switch S2 can be safely turned off before main power switch S1 is turned on by detecting the switching frequency of main power switch S1. However, due to efficiency requirements under light load, and size requirements of the switching power supply, the primary side control may need to perform low-frequency operation under a light load in order to improve the efficiency, and to perform high-frequency operation under a heavy load in order to reduce size requirements. Therefore, when the load changes from a light load to a heavy load, the switching frequency may increase, such that it is difficult for a secondary synchronous rectification chip to sample or predict when the main power switch is turned on. As a result the synchronous rectifier switch may not be safely turned off.

In order to ensure that the synchronous rectifier switch can be safely turned off in the CCM mode, in one approach, when the main power switch is turned on, the drain-source voltage of the secondary synchronous rectifier switch can rise, and when the drain-source voltage of the secondary synchronous rectifier switch rises to a fixed threshold, the secondary synchronous rectifier switch may be quickly turned off. In order to improve the turn-off speed of the synchronous rectifier switch, the internal circuit of the synchronous rectification controller can be optimized in order to reduce the turn-off delay time of the drive signal, and the decreasing time of the driving signal can also be reduced by increasing the drive discharge capacity of the synchronous rectification controller.

Figure 4:
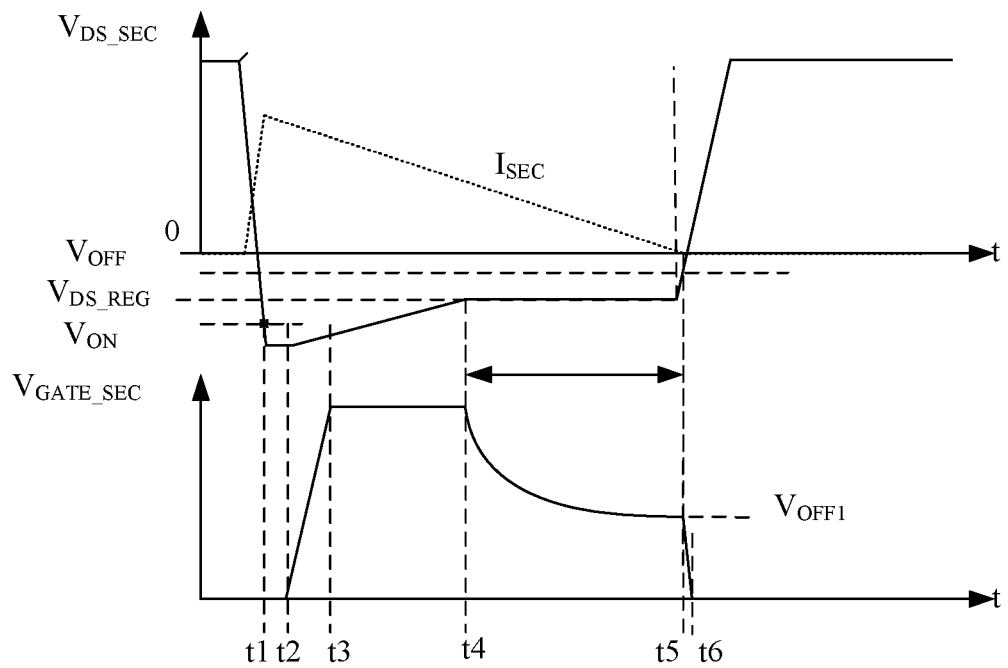
FIG. 4 is a waveform diagram of an example drive control for the synchronous rectification flyback converter.

Referring now to FIG. 4, shown is a waveform diagram of an example drive control for the synchronous rectification flyback converter. In this example, drive signal $V_{GATE\_SEC}$ of synchronous rectifier switch S2 can be controlled and adjusted by detecting drain-source voltage $V_{DS\_SEC}$ of synchronous rectifier switch S2. For example, at time t1, drain-source voltage $V_{DS\_SEC}$ of synchronous rectifier switch S2 drops to turn-on threshold $V_{ON}$. At time t2, after the internal turn-on delay time, drive signal $V_{GATE\_SEC}$ of synchronous rectifier switch S2 starts to rise. Until time t3, drive signal $V_{GATE\_SEC}$ of synchronous rectifier switch S2 rises to the maximum value and remains at the maximum value thereafter. Since synchronous rectification current $I_{SEC}$ decreases, drain-source voltage $V_{DS\_SEC}$ gradually rises during this period.

At time t4, drain-source voltage $V_{DS\_SEC}$ of synchronous rectifier switch S2 rises to fixed value $V_{DS\_REG}$. After that, as the current flowing through synchronous rectifier switch S2 gradually decreases, synchronous rectifier switch S2 is controlled to decrease by drive signal $V_{GATE\_SEC}$, thus increasing the conduction resistance of synchronous rectifier switch S2 to ensure that drain-source voltage $V_{DS\_SEC}$ of synchronous rectifier switch S2 can be maintained at fixed value $V_{DS\_REG}$. Before time t5, the current flowing through synchronous rectifier switch S2 is close to zero. At this time, the controller can adjust drive signal $V_{GATE\_SEC}$ to be close to off voltage $V_{OFF1}$ of synchronous rectifier switch. Then, drain-source voltage $V_{DS\_SEC}$ of synchronous rectifier switch S2 may not continue to maintain at fixed value $V_{DS\_REG}$ and starts to rise. At time t5, it rises to off threshold $V_{OFF}$ of synchronous rectifier switch S2. Therefore, drive signal $V_{GATE\_SEC}$ of synchronous rectifier switch S2 drops and starts to turn off synchronous rectifier switch S2. At time t6, drive signal $V_{GATE\_SEC}$ drops to zero.

That is, the drive signal of the synchronous rectifier switch can be adjusted by controlling the drain-source voltage of the synchronous rectifier switch to be maintained at a fixed value for a period of time before the synchronous rectifier switch is turned off, so as to realize quick turn-off of the synchronous rectifier switch. However, the drive signal is reduced in the period of time, such that the conduction resistance of the synchronous rectifier switch may be increased, and the conduction loss also increased.

In one embodiment, a synchronous rectification control circuit for controlling a switching circuit comprising a synchronous rectifier switch, can include: (i) a drive circuit configured to generate a drive signal to control switching states of the synchronous rectifier switch; and (ii) a voltage regulation circuit configured to control the drive circuit to adjust an amplitude of the drive signal to decrease to a preset threshold in an adjustment state when a drain-source voltage of the synchronous rectifier switch is greater than an adjustment threshold before the synchronous rectifier switch is turned off, where a time that the voltage regulation circuit is in the adjustment state is an adjustment time.

Figure 5:
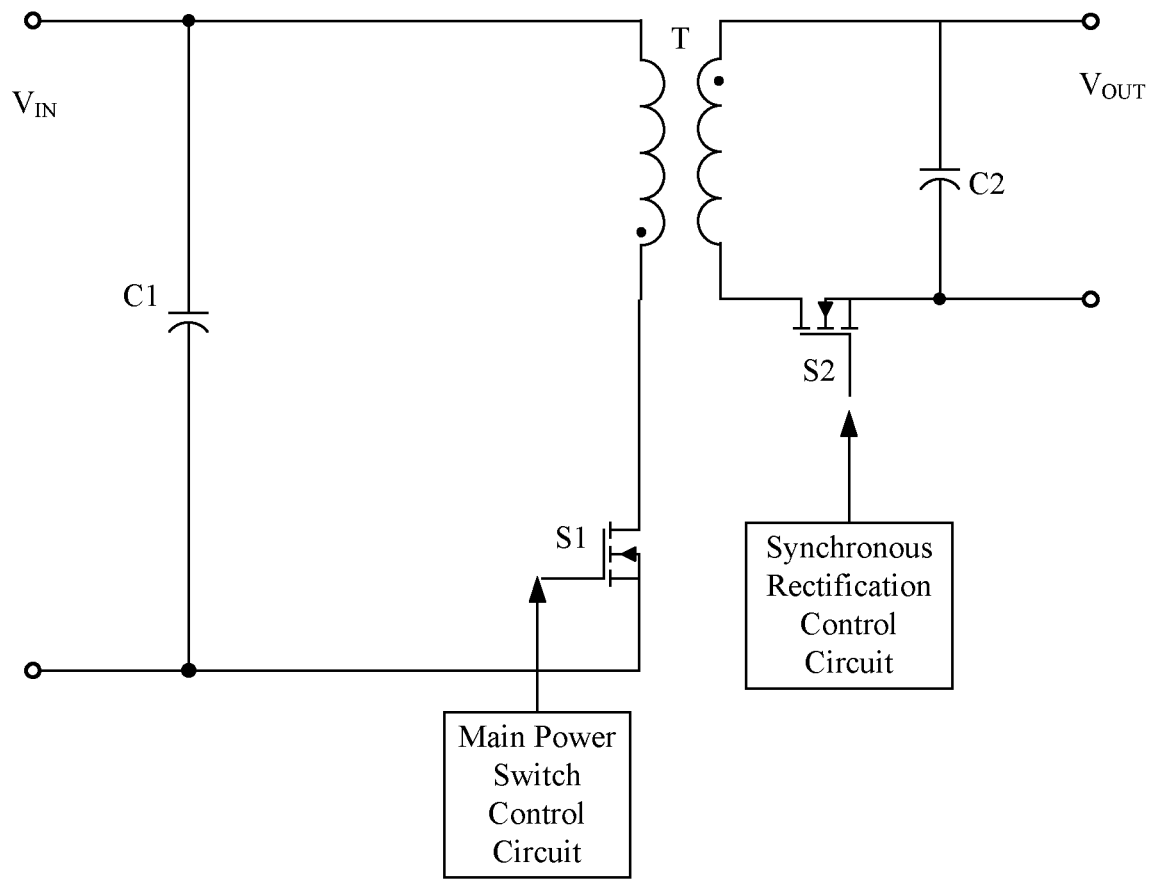
FIG. 5 is a schematic block diagram of an example synchronous rectification flyback converter, in accordance with embodiments of the present invention.

Referring now to FIG. 5, shown is schematic block diagram of an example synchronous rectification flyback converter, in accordance with embodiments of the present invention. In this particular example, the flyback converter can include main power switch S1, a main power switch control circuit, synchronous rectifier switch S2, a synchronous rectification control circuit, and a transformer. The synchronous rectification control circuit may generate drive signal $V_{GATE\_SEC}$ to control synchronous rectifier switch S2, and can realize reliable and fast shutdown of the synchronous rectifier switch, may reduce conduction loss of the synchronous rectifier switch, and can achieve high efficiency with a relatively simple control method. It should be understood that particular embodiments can also be applied to other switching circuits with synchronous rectification functionality.

Figure 6:
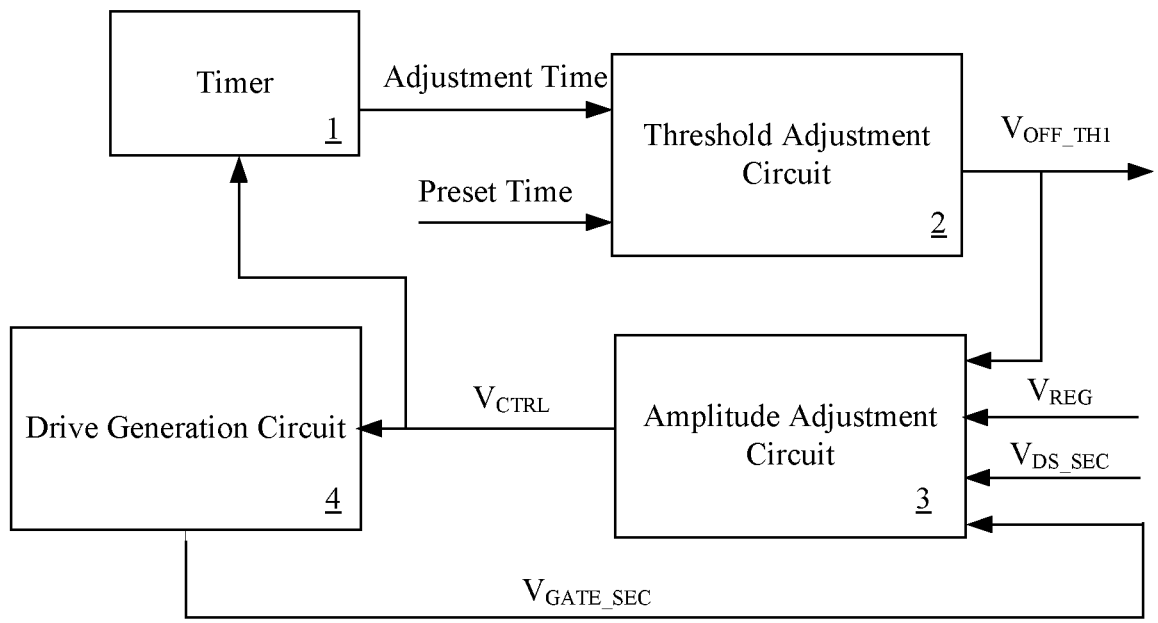
FIG. 6 is a schematic block diagram of a first example synchronous rectification control circuit, in accordance with embodiments of the present invention.

Referring now to FIG. 6, shown is a schematic block diagram of a first example synchronous rectification control circuit, in accordance with embodiments of the present invention. In this particular example, the synchronous rectification control circuit can include timer 1, a voltage regulation circuit that includes threshold adjustment circuit 2 and amplitude adjustment circuit 3, and drive circuit 4. Threshold adjustment circuit 2 can receive an adjustment time generated by timer 1, and may change adjustment threshold $V_{OFF\_TH1}$ by comparing the adjustment time against a preset/predetermined time, such that the adjustment time can be maintained as equal to the predetermined time.

Amplitude adjustment circuit 3 can receive adjustment threshold $V_{OFF\_TH1}$, drain-source voltage $V_{DS\_SEC}$, drive signal $V_{GATE\_SEC}$, and preset threshold $V_{REG}$ to generate drive control signal $V_{CTRL}$. Further, drive circuit 4 can receive drive control signal $V_{CTRL}$ generated by amplitude adjustment circuit 3 to control drive signal $V_{GATE\_SEC}$ to enter an adjustment state, such that drive signal $V_{GATE\_SEC}$ starts to drop. It should be understood that drive signal $V_{GATE\_SEC}$ can control the switching state of synchronous rectifier switch S2. For example, the adjustment time can represent the time period during which drive signal $V_{GATE\_SEC}$ enters the adjustment state; that is, the time period during drive signal $V_{GATE\_SEC}$ falls under the control of drive control signal $V_{CTRL}$. Timer 1 can obtain the adjustment time of drive signal $V_{GATE\_SEC}$ according to drive control signal $V_{CTRL}$ generated by amplitude adjustment circuit 3.

Figure 7:
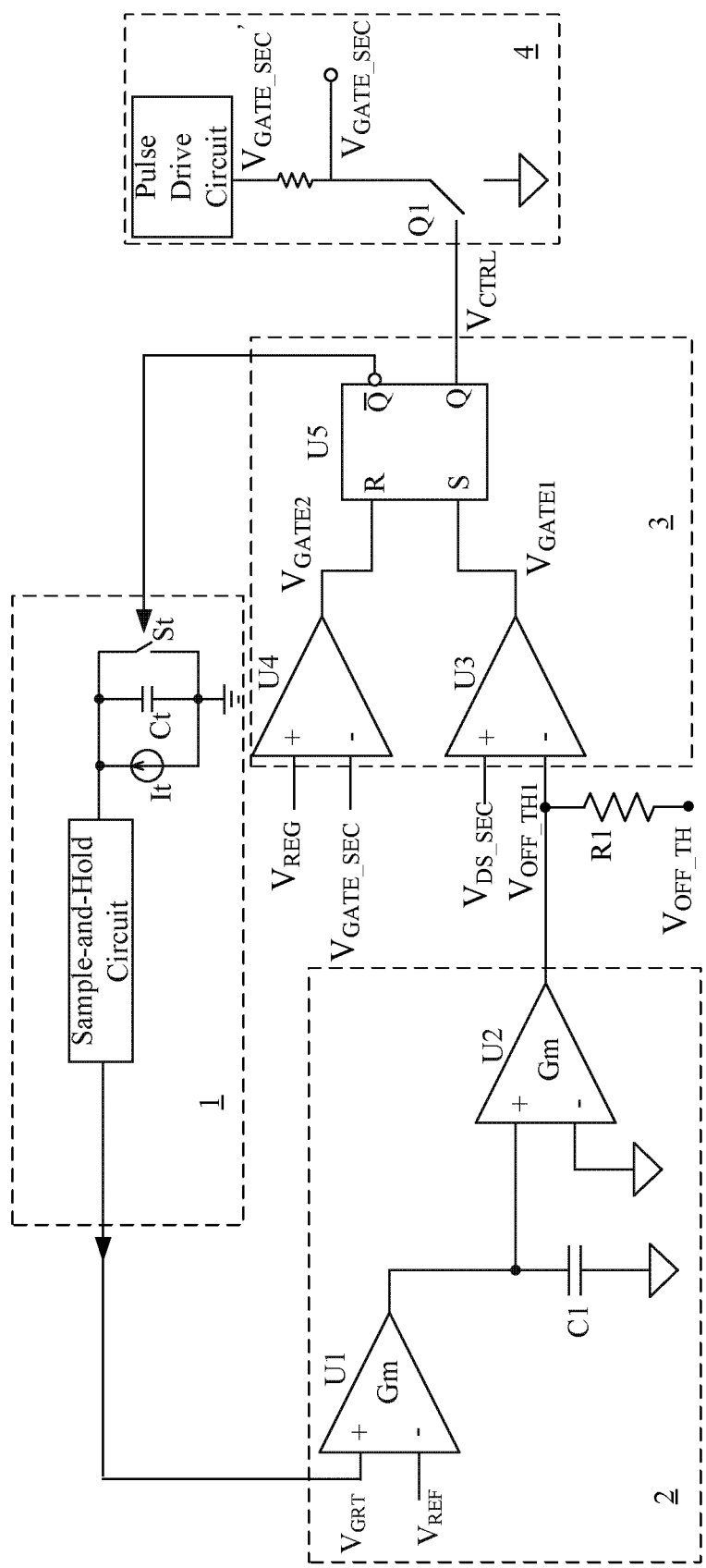
FIG. 7 is a schematic block diagram of a second example synchronous rectification control circuit, in accordance with embodiments of the present invention.

Referring now to FIG. 7, shown is a schematic block diagram of a second example synchronous rectification control circuit, in accordance with embodiments of the present invention. In this particular example, threshold adjustment circuit 2 can include transconductance amplifiers U1 and U2. For example, the non-inverting input terminal of transconductance amplifier U1 can receive adjustment time signal $V_{GRT}$ representing the adjustment time, the inverting input terminal of transconductance amplifier U1 can receive predetermined time signal $V_{REF}$ representing the predetermined time, an output terminal can connect to a first terminal of capacitor C1, and a second terminal of capacitor C1 can connect to a reference ground. For example, the non-inverting input terminal of transconductance amplifier U2 can connect to the first terminal of capacitor C1, the inverting input terminal of transconductance amplifier U2 can connect to the reference ground, an output terminal can connect to a first terminal of resistor R1, and a second terminal of resistor R1 can connect to reference adjustment threshold $V_{OFF\_TH}$ to obtain adjustment threshold $V_{OFF\_TH1}$ through voltage adjustment on resistor R1.

When the adjustment time is greater than the predetermined time, the output current of transconductance amplifier U1 can charge capacitor C1, such that the voltage across capacitor C1 increases. The current generated by transconductance amplifier U2 can increase with the increase of the voltage across capacitor C1, and thus the voltage on resistor R1 may accordingly increase, thereby increasing adjustment threshold $V_{OFF\_TH1}$. When the adjustment time is less than the predetermined time, the current generated by transconductance amplifier U1 can discharge capacitor C1, such that an error between the input terminals of transconductance amplifier U2 may be reduced, thereby reducing the output current of transconductance amplifier U2 and further reducing adjustment threshold $V_{OFF\_TH1}$. Threshold adjustment circuit 2 can also be formed by other circuit configurations (e.g., comparators and switches, current sources, etc.), in order to change the adjustment threshold by changing the charging current of the capacitor.

Amplitude adjustment circuit 3 can compare adjustment threshold $V_{OFF\_TH1}$ generated by threshold adjustment circuit 2 against drain-source voltage $V_{DS\_SEC}$ of synchronous rectifier switch S2. When drain-source voltage $V_{DS\_SEC}$ is greater than adjustment threshold $V_{OFF\_TH1}$, drive signal $V_{GATE\_SEC}$ generated by drive circuit 4 can be decreased according to drive control signal $V_{CTRL}$ generated by amplitude adjustment circuit 3. Amplitude adjustment circuit 3 can also compare drive signal $V_{GATE\_SEC}$ against preset threshold $V_{REG}$. When drive signal $V_{GATE\_SEC}$ is greater than preset threshold $V_{REG}$, drive control signal $V_{CTRL}$ generated by amplitude adjustment circuit 3 can control drive circuit 4 to stop pulling down drive signal $V_{GATE\_SEC}$.

Amplitude adjustment circuit 3 can include comparators U3 and U4. For example, the non-inverting input terminal of comparator U3 can receive drain-source voltage $V_{DS\_SEC}$, the inverting input terminal of comparator U3 can connect to the output terminal of transconductance amplifier U2 to receive adjustment threshold $V_{OFF\_TH1}$, and an output terminal may generate control signal $V_{GATE1}$. For example, the non-inverting input terminal of comparator U4 can receive preset threshold $V_{REG}$, the inverting input terminal of comparator U4 can receive drive signal $V_{GATE\_SEC}$ generated by drive circuit 4, and an output terminal may generate control signal $V_{GATE2}$. Amplitude adjustment circuit 3 can also include an RS flip-flop, where a set terminal of the RS flip-flop can receive control signal $V_{GATE1}$, a reset terminal of the RS flip-flop can receive control signal $V_{GATE2}$, and an output terminal may generate drive control signal $V_{CTRL}$.

When drain-source voltage $V_{DS\_SEC}$ is greater than adjustment threshold $V_{OFF\_TH1}$, control signal $V_{GATE1}$ generated by comparator U3 can be active. That is, the set terminal of the RS flip-flop may be active, such that drive control signal $V_{CTRL}$ generated by the RS flip-flop is active. When drive signal $V_{GATE\_SEC}$ drops below preset threshold $V_{REG}$, control signal $V_{GATE2}$ generated by comparator U4 can be active. That is, the reset terminal of the RS flip-flop may be active, making drive control signal $V_{CTRL}$ generated by the RS flip-flop inactive. For example, the active state represents a high level, and the inactive state represents a low level. It should be understood that adjustment threshold $V_{OFF\_TH1}$ and drain-source voltage $V_{DS\_SEC}$ are both negative values in this particular example, and positive values can also be used for comparison, while the logic of the comparators or RS flip-flop can accordingly be adjusted. In addition, the RS flip-flop can also be replaced by other circuits with the same or similar functionality.

Drive circuit 4 can include a pulse drive circuit and switch Q1. The pulse drive circuit can generate pulse drive signal $V_{GATE\_SEC}'$ with a rising edge and a falling edge to control the switch to be turned on and off. For example, when drain-source voltage $V_{DS\_SEC}$ of synchronous rectifier switch S2 reaches turn-on threshold $V_{ON}$, pulse drive signal $V_{GATE\_SEC}'$ with a high level may be generated via the internal delay circuit, and when drain-source voltage $V_{DS\_SEC}$ falls to turn-off threshold $V_{OFF}$, pulse drive signal $V_{GATE\_SEC}'$ with a low level may be generated, thereby generating pulse drive signal $V_{GATE\_SEC}'$. If there is no amplitude adjustment circuit 3, pulse drive signal $V_{GATE\_SEC}'$ can be used as a drive signal to drive the synchronous rectifier switch. It should be understood that the pulse drive circuit can be achieved by way of other configurations, as those skilled in the art would recognize.

In order to reduce the drive loss and realize fast turn-off, switch Q1 can be controlled to be turned on or off according to drive control signal $V_{CTRL}$ generated by amplitude adjustment circuit 3, thereby adjusting drive signal $V_{GATE\_SEC}$. When drive control signal $V_{CTRL}$ is active (e.g., when drain-source voltage $V_{DS\_SEC}$ is greater than adjustment threshold $V_{OFF\_TH1}$), switch Q1 may be turned on to pull down pulse drive signal $V_{GATE\_SEC}$, such that drive signal $V_{GATE\_SEC}$ finally drops. When drive control signal $V_{CTRL}$ is inactive (e.g., when drive signal $V_{GATE\_SEC}$ drops below preset threshold $V_{REG}$), switch Q1 can be turned off to stop pulling down pulse drive signal $V_{GATE\_SEC}$, such that drive signal $V_{GATE\_SEC}$ stops falling, thereby realizing the adjustment of drive signal $V_{GATE\_SEC}$. In this way, drive signal $V_{GATE\_SEC}$ generated by drive circuit 4 may be used to drive the synchronous rectifier switch in order to realize reliable and fast turn-off and to reduce the drive loss thereof.

Timer 1 can receive drive control signal $V_{CTRL}$ generated by amplitude adjustment circuit 3 to sample the active time of drive control signal $V_{CTRL}$ to characterize the adjustment time. In this example, timer 1 can include switch St, capacitor Ct, and current source It coupled in parallel. Timer 1 can also include a sample-and-hold circuit. When drive control signal $V_{CTRL}$ is active (e.g., when drive signal $V_{GATE\_SEC}$ is in the adjustment state), switch St can be turned off, and current source It can charge capacitor Ct. When drive control signal $V_{CTRL}$ is inactive (e.g., when drive signal $V_{GATE\_SEC}$ is not in the adjustment state), switch St may be turned on and capacitor Ct can be discharged. After being sampled and held by the sample-and-hold circuit, adjustment time signal $V_{GRT}$ can be obtained, which may represent the adjustment time during which the drive signal is in the adjustment state. It should be understood that the adjustment time signal can be obtained according to the value in the last period by the sample-and-hold circuit, and it also be obtained by holding the values of the previous periods with the sample-and-hold circuit, and then being compared against predetermined time signal $V_{REF}$.

From the above, it can be seen that when adjustment time signal $V_{GRT}$ is greater than predetermined time signal $V_{REF}$, adjustment threshold $V_{OFF\_TH1}$ can increase, but preset threshold $V_{REG}$ does not change, such the time that capacitor C1 is charged by current source It in the next period may decrease, such that adjustment time signal $V_{GRT}$ decreases to approach predetermined time signal $V_{REF}$. Similarly, when adjustment time signal $V_{GRT}$ is less than predetermined time signal $V_{REF}$, the time that capacitor C1 is charged by current source It in the next period can increase, thereby increasing adjustment time signal $V_{GRT}$, such that the adjustment time can be controlled in a closed loop within a smaller predetermined time, and thus reducing the conduction loss of the synchronous rectifier switch. In the examples herein, only one implementation to obtain the adjustment time is provided here; however those skilled in the art should will recognize that other ways to obtain the adjustment time may also be employed, such as by sampling the pull-down time of the drive signal.

Figure 8:
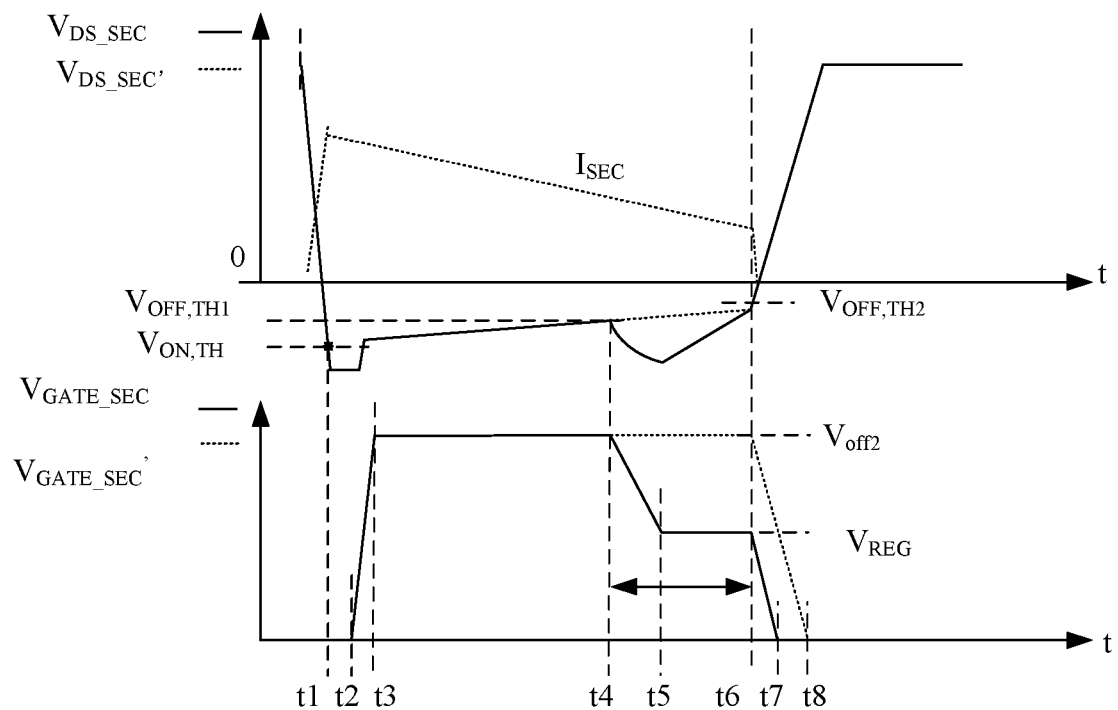
FIG. 8 is a waveform diagram of example drive control for the synchronous rectification flyback converter, in accordance with embodiments of the present invention.

Referring now to FIG. 8, shown is a waveform diagram of an example drive control for the synchronous rectification flyback converter in accordance with embodiments of the present invention. Here, waveforms of $V_{DS\_SEC}$ and $V_{GATE\_SEC}$ with solid lines are operation waveforms obtained by performing controlling in accordance with particular embodiments, and waveforms of $V_{DS\_SEC}'$ and $V_{GATE\_SEC}'$ with dotted lines are operation waveforms when the synchronous rectification control circuit operates without adjustment. In this example, at time t1, drain-source voltage $V_{DS\_SEC}$ of synchronous rectifier switch S2 (shown by the solid line in FIG. 8) drops to turn-on threshold $V_{ON}$ of synchronous rectifier switch S2, and synchronous rectification current $I_{SEC}$ flowing through synchronous rectifier switch S2 rises. Period t1-t2 is the delay time of the internal delay circuit for synchronous rectifier switch S2, during which drain-source voltage $V_{DS\_SEC}$ remains unchanged.

After time t2, pulse drive signal $V_{GATE\_SEC}$ (shown by the dotted line in FIG. 8) starts to rise and reaches the maximum value at time t3 and remains unchanged thereafter. During this period, synchronous rectification current $I_{SEC}$ gradually decreases, such that drain-source voltage $V_{DS\_SEC}$ gradually rises. Since pulse drive signal $V_{GATE\_SEC}$ may not be adjusted during this period, drive signal $V_{GATE\_SEC}$ can be the same as pulse drive signal $V_{GATE\_SEC}$. At time t4, drain-source voltage $V_{DS\_SEC}'$ should have continued to rise if it is not regulated. However, since drain-source voltage $V_{DS\_SEC}$ rises to adjustment threshold $V_{OFF\_TH1}$, drive control signal $V_{CTRL}$ may be enabled, such that drive signal $V_{GATE\_SEC}$ enters the adjustment state and starts to drop. At this time, the conduction resistance of synchronous rectifier switch S2 can increase due to the drop of drive signal $V_{GATE\_SEC}$, thereby causing drain-source voltage $V_{DS\_SEC}$ to drop. Until time t5, drive signal $V_{GATE\_SEC}$ drops to preset threshold $V_{REG}$, and may remain at preset threshold $V_{REG}$. Since main power switch S1 is about to be turned on, synchronous rectification current $I_{SEC}$ can continue to decrease, and thus drain-source voltage $V_{DS\_SEC}$ may begin to rise.

At time t6, drain-source voltage $V_{DS\_SEC}$ may rise to turn-off threshold $V_{ON}$ of synchronous rectifier switch S2, and then drive signal $V_{GATE\_SEC}$ drops to turn off synchronous rectifier switch S2. Since drive signal $V_{GATE\_SEC}$ has dropped to preset threshold $V_{REG}$ before synchronous rectifier switch S2 is turned off, and preset threshold $V_{REG}$ is lower, synchronous rectifier switch S2 can be quickly turned off. In this example, drive signal $V_{GATE\_SEC}$ drops to zero at time t7, while without using this approach, synchronous rectifier switch S2 can be turned off at time t8. In addition, since preset threshold $V_{REG}$ is lower, the conduction resistance of the synchronous rectifier switch may be greater, such that when drain-source voltage $V_{DS\_SEC}$ of synchronous rectifier switch S2 is less than turn-off threshold $V_{OFF}$, synchronous rectifier current $I_{SEC}$ is close to zero.

When drive signal $V_{GATE\_SEC}$ enters the adjustment state (e.g., at time t4), timer 1 can be triggered to start timing, and timer 1 may stop timing at time t6. For example, the time between t4 and t6 is the adjustment time represented by adjustment time signal $V_{GRT}$, and the adjustment time can be maintained at the predetermined time by changing adjustment threshold $V_{OFF\_TH1}$. In addition, by selecting the appropriate preset threshold $V_{REG}$, the adjustment time can be reduced in order to reduce the conduction loss when the synchronous rectifier switch operates.

In particular embodiments, the drive signal may not need to be adjusted all the time, and the control method is simplified relative to other approaches. Further, the drive signal may not drop during most of the time (i.e., the adjustment time is short) such that the conduction resistance of the synchronous rectifier switch may only increase in a smaller adjustment time, thereby reducing the conduction loss. In addition, the drive signal can be controlled at a lower preset threshold before turning off the synchronous rectifier switch, such that the conduction resistance of the synchronous rectifier switch is greater, and the synchronous rectifier current is close to zero when the drain-source voltage of the synchronous rectifier switch is less than the turn-off threshold.

In one embodiment, a control method for a synchronous rectification control circuit comprising a synchronous rectifier switch, can include: (i) detecting a drain-source voltage of the synchronous rectifier switch; (ii) comparing the drain-source voltage against an adjustment threshold before the synchronous rectifier switch is turned off; and (iii) adjusting an amplitude of a drive signal for driving the synchronous rectifier switch to a preset threshold in an adjustment state when the drain-source voltage is greater than the adjustment threshold.

In certain embodiments, a synchronous rectification control method can include the drain-source voltage of the synchronous rectifier switch being detected. Then, the drain-source voltage can be compared against the adjusting threshold before the synchronous rectifier switch is turned off. When the drain-source voltage is greater than the adjusting threshold, the drive signal for controlling operation states of the synchronous rectifier switch may enter the adjustment state, such that the amplitude of the drive signal is adjusted to decrease to the preset threshold. For example, the adjustment time in the adjustment state may be adaptively adjusted with the change of the adjustment threshold.

The example synchronous rectification control method can also include the adjustment time in the adjustment state being detected. Then, the adjustment time can be compared against the predetermined time to adjust the adjustment threshold, such that the adjustment time can be equal to the predetermined time. Further, adjusting the adjustment threshold can include increasing the adjustment threshold when the adjustment time is greater than the predetermined time, and decreasing the adjustment threshold when the adjustment time is less than the predetermined time.

In addition, the drive signal may be adjusted according to the adjustment threshold, drain-source voltage, preset threshold, and drive signal, such that the amplitude of the drive signal may be maintained at the preset threshold within a predetermined time. By comparing the drain-source voltage and the adjustment threshold, a first control signal can be generated in order to reduce the amplitude of the drive signal. Also, a second control signal may be generated by comparing the amplitude of the drive signal against the preset threshold, in order to maintain the amplitude of the drive signal at the preset threshold when the amplitude of the drive signal falls to the preset threshold. The drive control signal can be generated according to both the first and second control signals.

In addition, the example synchronous rectification control method can include controlling a pulse drive signal to rise and maintain to the first voltage when the drain-source voltage is less than the turn-on threshold of the synchronous rectifier switch. The example synchronous rectification control method can also include controlling the pulse drive signal to drop to the second voltage when the drain-source voltage rises to be greater than the turn-off threshold of the synchronous rectifier switch, receiving the pulse drive signal, and adjusting and generating the drive signal under the control of the drive control signal.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A synchronous rectification control circuit for controlling a switching circuit comprising a synchronous rectifier switch, the control circuit comprising:
a) a drive circuit configured to generate a drive signal to control switching states of the synchronous rectifier switch;
b) a voltage regulation circuit configured to control the drive circuit to adjust an amplitude of the drive signal to decrease to a preset threshold in an adjustment state when a drain-source voltage of the synchronous rectifier switch is greater than an adjustment threshold before the synchronous rectifier switch is turned off, wherein a time that the voltage regulation circuit is in the adjustment state is an adjustment time; and
c) wherein the voltage regulation circuit comprises a threshold adjustment circuit configured to adjust the adjustment threshold in order to make the adjustment time equal to a predetermined time.

2. The control circuit of claim 1, wherein the adjustment time changes adaptively in accordance with a change of the adjustment threshold.

3. The control circuit of claim 1, wherein the threshold adjustment circuit is configured to adjust the adjustment threshold in accordance with the adjustment time in previous periods and the predetermined time, in order to make the adjustment time equal to the predetermined time.

4. The control circuit of claim 1, wherein the threshold adjustment circuit is configured to adjust the adjustment threshold in accordance with the adjustment time in a last period and the predetermined time, in order to make the adjustment time equal to the predetermined time.

5. The control circuit of claim 4, wherein:
a) the adjustment threshold is increased when the adjustment time is greater than the predetermined time, and
b) the adjustment threshold is reduced when the adjustment time is not greater than the predetermined time.

6. The control circuit of claim 4, wherein the threshold adjustment circuit further comprises:
a) a first transconductance amplifier having a first input terminal to receive the adjustment time, a second input terminal to receive the predetermined time, and an output terminal coupled to a first capacitor, in order to generate a reference voltage by charging and discharging the first capacitor; and
b) a second transconductance amplifier having a first input terminal to receive the reference voltage, a second input terminal coupled to a ground, and an output terminal coupled to a first resistor, in order to generate the adjustment threshold through the first resistor.

7. The control circuit of claim 4, wherein the voltage regulation circuit further comprises an amplitude adjustment circuit configured to adjust the drive signal in accordance with the adjustment threshold, the drain-source voltage, and the preset threshold, such that the amplitude of the drive signal is decreased to the preset threshold within the predetermined time.

8. The control circuit of claim 7, wherein the amplitude adjustment circuit comprises:
a) a first comparator configured to receive the drain-source voltage against the adjustment threshold, and to generate a first control signal to decrease the amplitude of the drive signal when the drain-source voltage is greater than the adjustment threshold; and
b) a second comparator configured to receive the drive signal and the preset threshold, and to generate a second control signal to maintain the amplitude of the drive signal at the preset threshold, wherein a drive control signal is generated by the first and second control signals.

9. The control circuit of claim 8, wherein the drive circuit comprises:
a) a pulse drive circuit configured to generate a pulse drive signal having a rising edge and a falling edge in accordance with the drain-source voltage; and
b) a drive generation circuit configured to generate the drive signal to control the synchronous rectifier switch in accordance with the pulse drive signal and the drive control signal.

10. The control circuit of claim 9, wherein:
a) the pulse drive signal increases to a first voltage when the drain-source voltage is less than a turn-on threshold of the synchronous rectifier switch; and
b) the pulse drive signal decreases to a second voltage when the drain-source voltage is greater than a turn-off threshold of the synchronous rectifier switch.

11. The control circuit of claim 1, wherein the voltage regulation circuit comprises a timer configured to obtain the adjustment time.

12. A switching circuit, comprising the synchronous rectification control circuit of claim 1, and further comprising:
a) a main power switch and a synchronous rectifier switch; and
b) a main control circuit for controlling the main power switch.

13. The control circuit of claim 1, wherein the threshold adjustment circuit comprises a transconductance amplifier that receives signals representing the predetermined time and the adjustment time.

14. A control method for a synchronous rectification control circuit comprising a synchronous rectifier switch, the method comprising:
a) detecting a drain-source voltage of the synchronous rectifier switch;
b) comparing the drain-source voltage against an adjustment threshold before the synchronous rectifier switch is turned off;
c) adjusting an amplitude of a drive signal for driving the synchronous rectifier switch to a preset threshold in an adjustment state when the drain-source voltage is greater than the adjustment threshold, wherein a time in the adjustment state is an adjustment time; and
d) adjusting the adjustment threshold in order to make the adjustment time equal to a predetermined time.

15. The method of claim 14, wherein an adjustment time for entering the adjustment state changes adaptively in accordance with a change of the adjustment threshold.

16. The method of claim 15, further comprising:
a) detecting the adjustment time for entering the adjustment state; and
b) comparing the adjustment time in a last period against the predetermined time to adjust the adjustment threshold, in order to make the adjustment time equal to the predetermined time.

17. The method of claim 16, further comprising:
a) increasing the adjustment threshold when the adjustment time is greater than the predetermined time; and
b) decreasing the adjustment threshold when the adjustment time is less than the predetermined time.

18. The method of claim 14, further comprising adjusting the drive signal in accordance with the adjustment threshold, the drain-source voltage and the preset threshold, such that the amplitude of the drive signal is decreased to the preset threshold within the predetermined time.

19. The method of claim 18, further comprising:
a) comparing the drain-source voltage against the adjustment threshold to generate a first control signal to decrease the amplitude of the drive signal; and
b) comparing the amplitude of the drive signal against the preset threshold to generate a second control signal to maintain the amplitude of the drive signal at the preset threshold, wherein a drive control signal is generated by the first and second control signals.

20. The method of claim 19, wherein further comprising:
a) increasing a pulse drive signal to a first voltage when the drain-source voltage is less than a turn-on threshold of the synchronous rectifier switch;
b) decreasing the pulse drive signal to a second voltage when the drain-source voltage is greater than a turn-off threshold of the synchronous rectifier switch;
c) receiving the pulse drive signal and adjusting the drive signal in accordance with the drive control signal; and
d) generating the drive signal to control the synchronous rectifier switch.

\* \* \* \* \*